United States Patent
Yoshino et al.

(10) Patent No.: US 9,654,472 B2
(45) Date of Patent: May 16, 2017

(54) STORAGE COUNT VERIFICATION SYSTEM

(71) Applicant: Hitachi, Ltd., Tokyo (JP)

(72) Inventors: Masayuki Yoshino, Tokyo (JP); Hisayoshi Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/896,105

(22) PCT Filed: Jun. 18, 2013

(86) PCT No.: PCT/JP2013/066763
§ 371 (c)(1),
(2) Date: Dec. 4, 2015

(87) PCT Pub. No.: WO2014/203339
PCT Pub. Date: Dec. 24, 2014

(65) Prior Publication Data
US 2016/0119345 A1    Apr. 28, 2016

(51) Int. Cl.
*H04L 29/06*    (2006.01)
*H04L 29/08*    (2006.01)
(Continued)

(52) U.S. Cl.
CPC .......... *H04L 63/0876* (2013.01); *G06F 17/30* (2013.01); *G06F 17/30628* (2013.01);
(Continued)

(58) Field of Classification Search
CPC . G06F 17/30; G06F 17/30628; H04L 9/3218; H04L 9/3033; H04L 67/1097;
(Continued)

(56) References Cited

U.S. PATENT DOCUMENTS

| 7,194,621 B1 * | 3/2007 | Nguyen | H04L 9/0841 |
| | | | 713/162 |
| 2009/0010436 A1 * | 1/2009 | Fuhr | H04L 9/30 |
| | | | 380/259 |

(Continued)

FOREIGN PATENT DOCUMENTS

WO    2012/077541 A1    6/2012

OTHER PUBLICATIONS

Wang, Cong et al., "Secure Ranked Keyword Search over Encrypted Cloud Data", 2010 International Conference on Distributed Computing Systems, IEEE, pp. 253-262.*
(Continued)

*Primary Examiner* — Michael Pyzocha
(74) *Attorney, Agent, or Firm* — Mattingly & Malur, PC

(57) ABSTRACT

A storage count verification system is provided in which a client can verify the number of identical data items stored by a server without the server being notified of the results. A storage count verification system verifies whether a user device and a server device have identical data where search data requested by a user device is used to search data to be searched on a server device. The server device generates a public parameter for searching the data to be searched and transmits the generated public parameter to the user device. The user device is provided with a user generation unit for generating, on the basis of the public parameter received from the server device, a secret parameter that is for the search data and corresponds to the public parameter and a user encryption unit for encrypting the search data on the basis of the generated secret parameter.

6 Claims, 11 Drawing Sheets

(51) Int. Cl.
  *H04L 9/32* (2006.01)
  *H04L 9/30* (2006.01)
  *G06F 17/30* (2006.01)
(52) U.S. Cl.
  CPC .......... *H04L 9/3033* (2013.01); *H04L 9/3218* (2013.01); *H04L 63/0442* (2013.01); *H04L 63/061* (2013.01); *H04L 67/1097* (2013.01)
(58) Field of Classification Search
  CPC H04L 63/0442; H04L 63/061; H04L 63/0876
  See application file for complete search history.

(56) References Cited

U.S. PATENT DOCUMENTS

| | | | | |
|---|---|---|---|---|
| 2010/0169321 A1* | 7/2010 | Wang | ............... | G06F 21/6227 707/741 |
| 2011/0110525 A1* | 5/2011 | Gentry | ............... | H04L 9/0822 380/285 |
| 2011/0119481 A1* | 5/2011 | Auradkar | ............ | G06F 21/602 713/150 |
| 2011/0167003 A1* | 7/2011 | Nice | ............... | G06Q 30/0271 705/50 |
| 2012/0297201 A1* | 11/2012 | Matsuda | ............ | G06F 21/6245 713/189 |
| 2012/0324240 A1* | 12/2012 | Hattori | ............... | G06F 21/6227 713/189 |
| 2013/0148803 A1* | 6/2013 | Jho | ............... | H04L 9/3073 380/44 |
| 2013/0216044 A1* | 8/2013 | Gentry | ............... | H04L 9/008 380/277 |
| 2013/0246813 A1* | 9/2013 | Mori | ............... | G06F 17/30289 713/193 |
| 2013/0262863 A1 | 10/2013 | Yoshino et al. | | |
| 2013/0287210 A1* | 10/2013 | Matsuda | ............ | H04L 9/0894 380/44 |
| 2015/0095664 A1* | 4/2015 | Furukawa | ............ | G06F 21/62 713/193 |

OTHER PUBLICATIONS

Popa, Raluca Ada et al., "CryptDB: Protecting Confidentiality with Encrypted Query Processing", SOSP '11, Oct. 23-26, 2011, ACM, pp. 85-100.*
Boneh, Dan et al., "Public Key Encryption with keyword Search", EUROCRYPT 2004, LNCS 3027, pp. 506-522.*
Emiliano De Cristofaro et al., "Fast and Private Computation of Cardinality of Set Intersection and Union", Cryptography ePring Archive 2011/141.
International Search Report of PCT/JP2013/066763.

* cited by examiner

A. STORAGE COUNT VERIFICATION SYSTEM

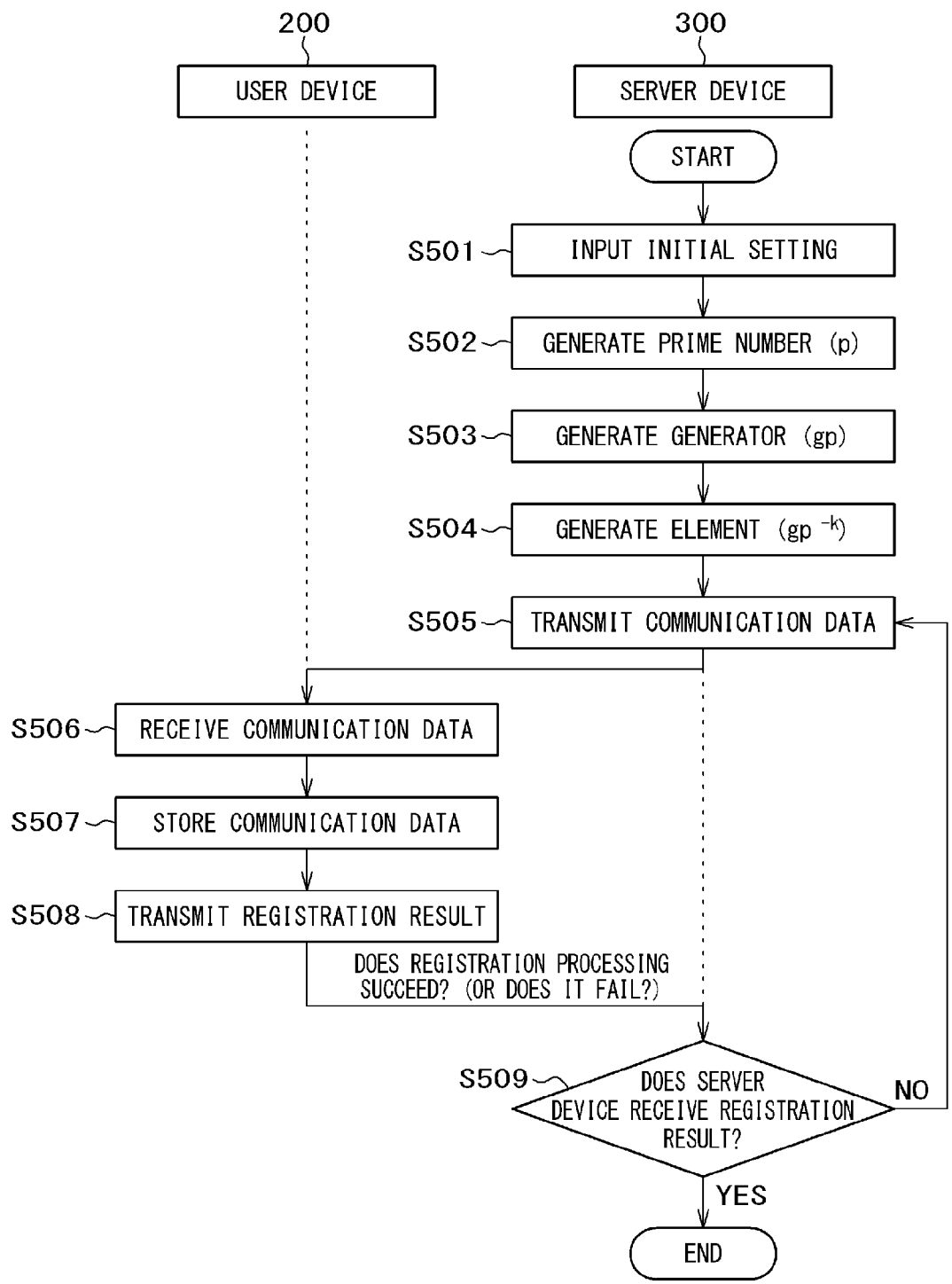

(VERIFICATION OF STORAGE COUNT OF IDENTICAL DATA 1)

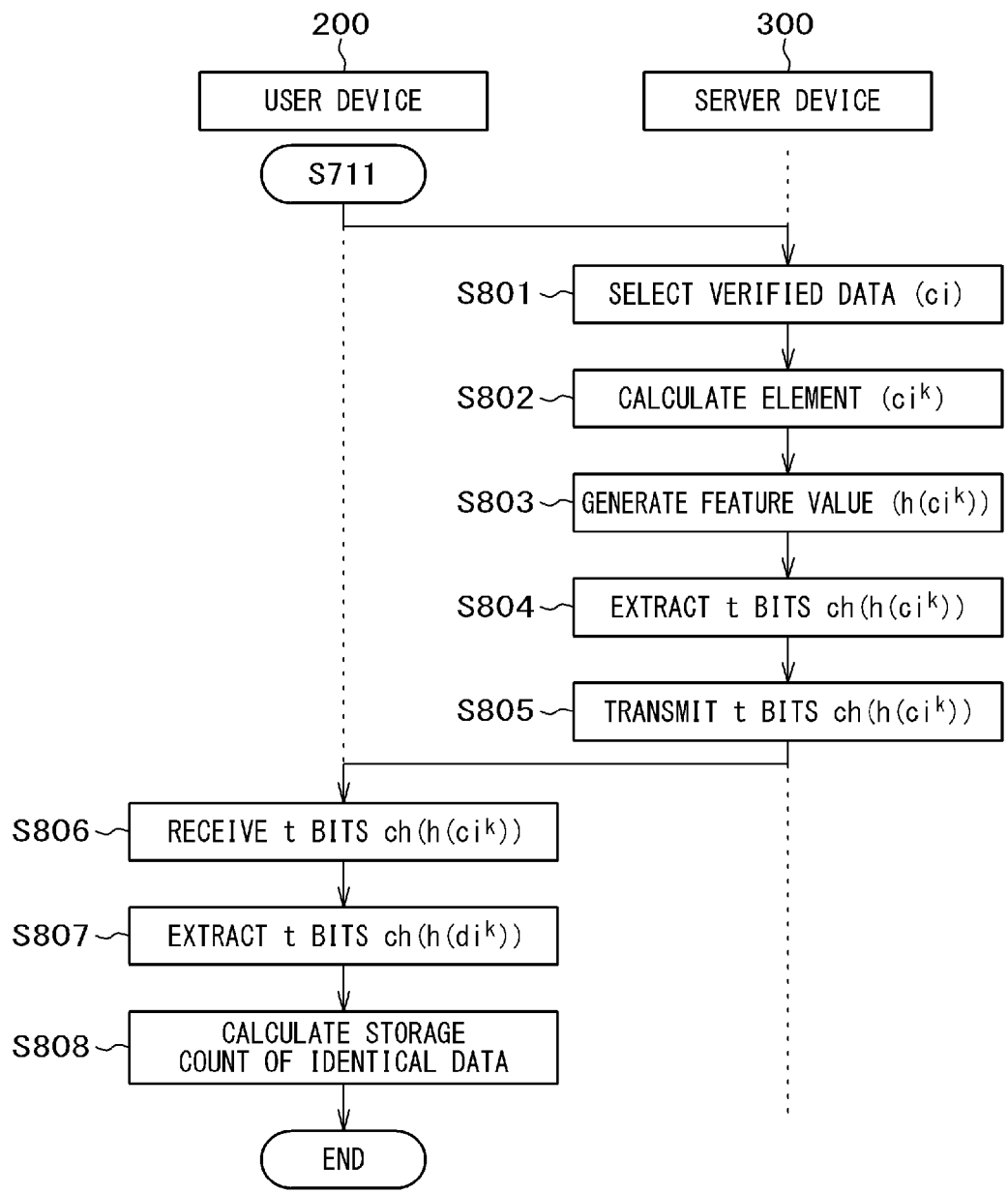

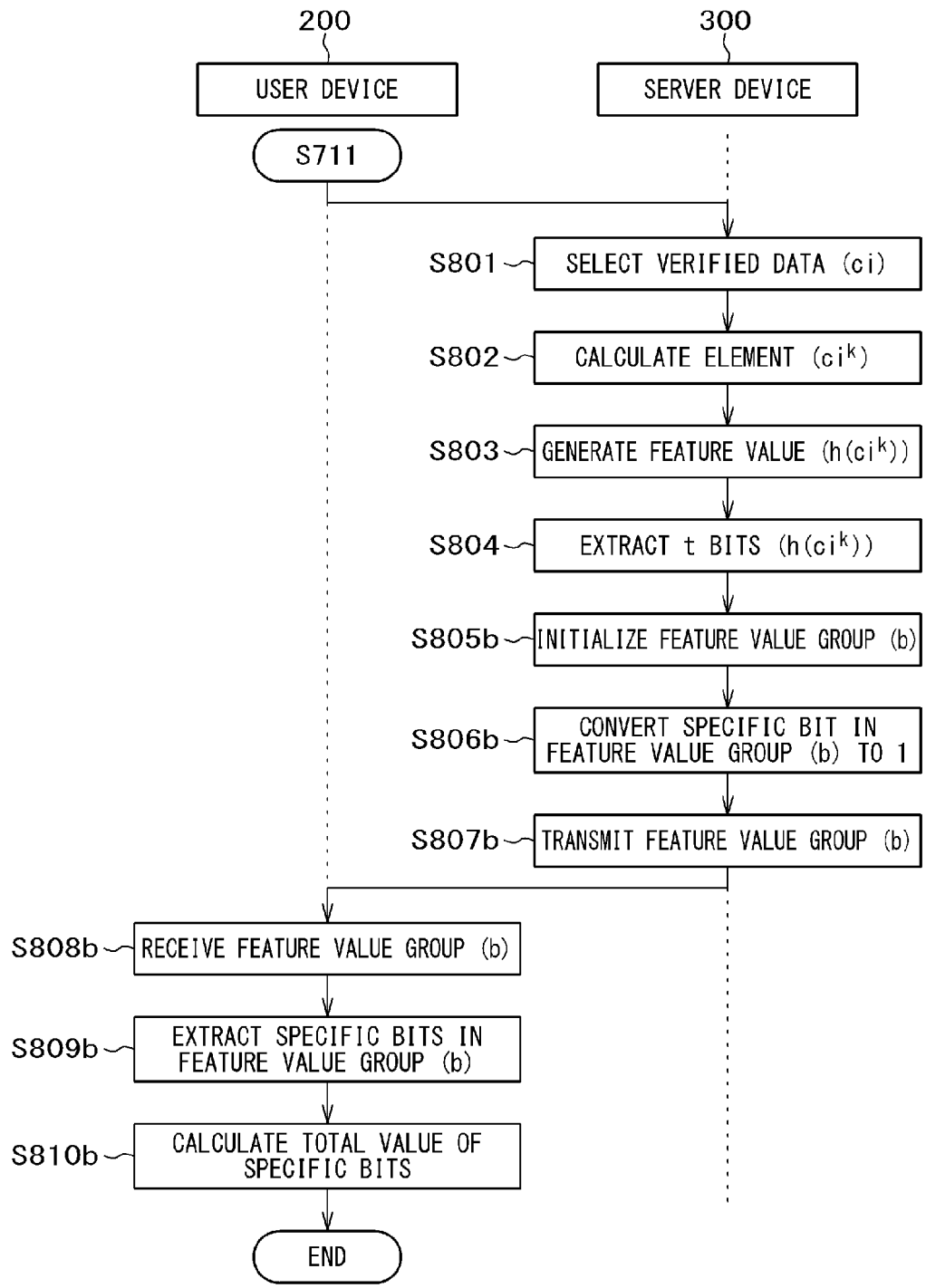

STORAGE COUNT VERIFICATION SYSTEM

TECHNICAL FIELD

The present invention relates to a storage count verification system that verifies a count of data which is held by a server and which are identical with data of a client without the client disclosing information to the server.

BACKGROUND ART

Data volume managed by information systems represented by a cloud-based system continues to increase. Research for applying these data is advanced, while at the same time, it is regarded as important how to keep privacy of data in the information systems. To realize this, research for applying data, maintaining privacy of the data exists. For example, in Patent Literature 1 and Non-patent Literature 1, an encryption method of verifying whether a server holds identical data with data held by a client in a server-client model or not (searching identical data) is disclosed.

CITATION LIST

Patent Literature

Patent Literature 1: WO 2012/077541, "Searchable Encryption Processing System", written by Masayuki Yoshino, Hisayoshi Sato and Ken Naganuma.
Non-patent Literature 1: Cryptography ePring Archive 2011/141, Fast and Private Computation of Cardinality of Set Intersection and Union, Emiliano De Cristofaro, Paolo Gasti, and Gene Tsudik.

SUMMARY OF INVENTION

Technical Problem

However, when technique disclosed in Patent Literature 1 is used, there occurs a problem related to privacy of data that every time a client verifies whether a server holds identical data or not, the server is notified of a result (a result of a search). In the meantime, in Non-patent Literature 1, a method of concealing a result from a server is disclosed. However, a client is required to make intricate calculation in processing called exponential modulus multiplication. Since it is required to enable a client to process using a computer having only low computing power such as a cellular phone and compact PC, the abovementioned method has a problem in terms of the efficiency of calculation. In view of the abovementioned, it is a problem to be solved that the server is not notified of whether the client holds identical data or not and an excessive load of processing is not imposed upon the client.

Solution to Problem

To solve the abovementioned problem and achieve an object, a storage count verification system according to the present invention is based upon a storage count verification system that verifies whether both a user device and a server device hold identical data or not when data to be searched in the server device is searched using search data requested from the user device, and has a characteristic that the server device is provided with a server generator that generates a public parameter for searching the data to be searched and a server communication unit that transmits the generated public parameter to the user device, and the user device is provided with a user generator that generates a secret parameter related to the search data and corresponding to the public parameter on the basis of the public parameter received from the server device and a user encryption unit that encrypts the search data on the basis of the generated secret parameter.

Advantageous Effects of Invention

According to the present invention, a client can verify a count of identical data held by a server without notifying the server of a result.

BRIEF DESCRIPTION OF DRAWINGS

FIG. 5 is a flowchart showing a procedure of a process for registering a public parameter according to the first embodiment.
FIG. 8A is a flowchart showing a latter half of the procedure of the process for verifying the storage count of identical data according to the first embodiment.
FIG. 8B is a flowchart showing the latter half of the procedure of the process for verifying the storage count of identical data according to the first embodiment.

DESCRIPTION OF EMBODIMENTS

Figure 1:
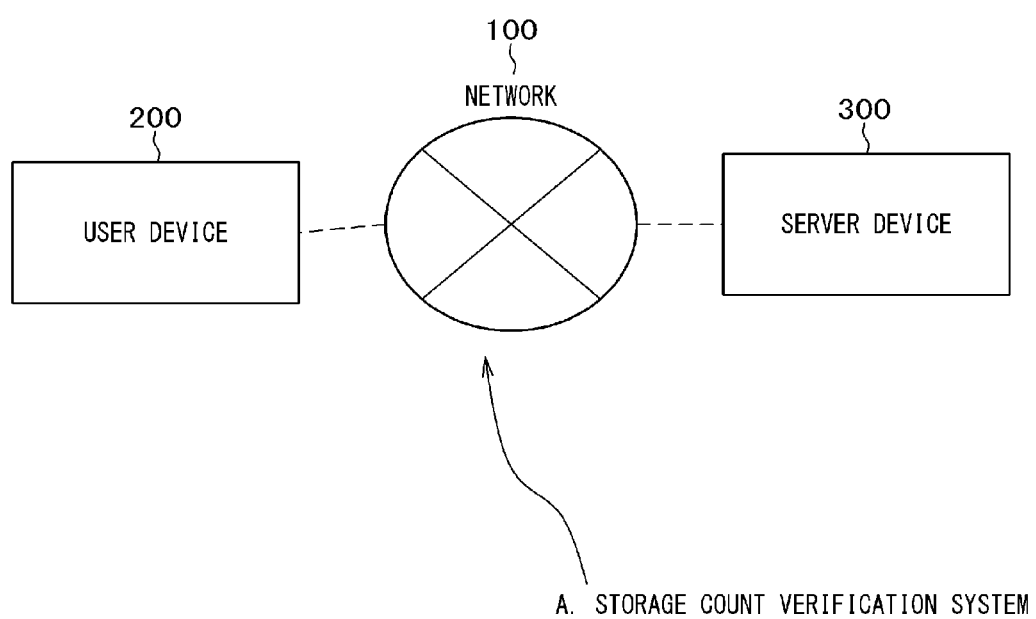
FIG. 1 shows an example of the configuration of a storage count verification system according to this embodiment.

Next, an embodiment of the present invention will be described in detail, appropriately referring to the drawings. In the embodiment, the same reference numeral is allocated to the same member in principle and its repeated description is omitted.

<<System Configuration>>

FIG. 1 shows an example of the configuration of a storage count verification system A according to this embodiment. The configuration shown in FIG. 1 is common to that of a first embodiment described later. The storage count verification system A has configuration that a user device 200 and a server device 300 are mutually connected via a network 100. For example, in a certain service provider, the network 100 denotes the Internet, the server device 300 is installed in a cloud provider, and the user device 200 denotes a cellular phone, a smartphone and others.

First Embodiment

Next, a first embodiment of the present invention will be described, referring to FIGS. 2 to 10.

(User Device)

Figure 2:
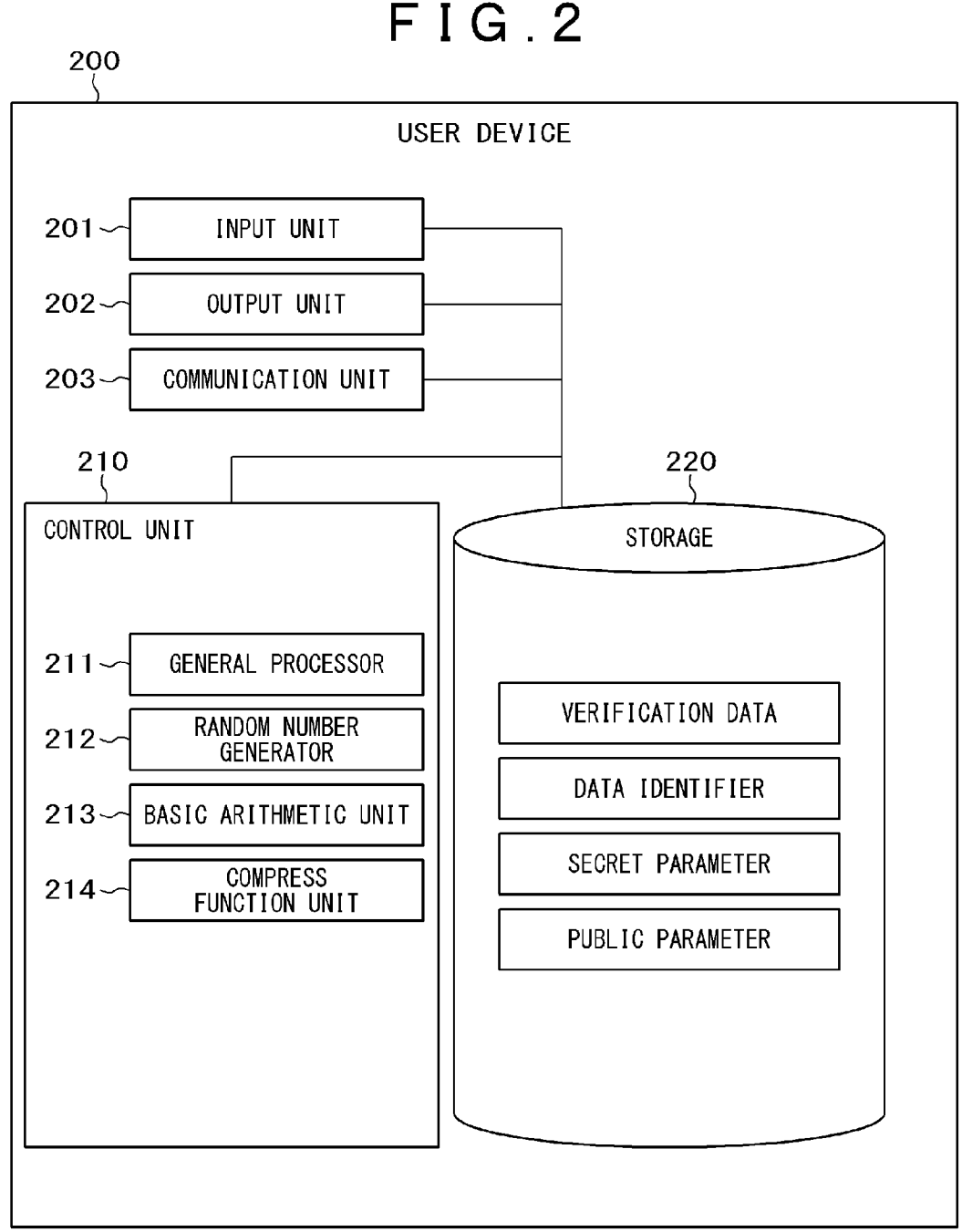
FIG. 2 shows an example of the configuration of a user device according to a first embodiment.

FIG. 2 is a functional schematic diagram showing an example of the configuration of a user device 200 according to the first embodiment. As shown in FIG. 2, the user device 200 is provided with a control unit 210 that processes data, a storage 220 that stores the data, an input unit 201 that inputs information, an output unit 202 that outputs information and a communication unit 203 that transmits/receives data to/from an external device.

The control unit 210 is provided with a general processor 211, a random number generator 212, a basic arithmetic unit 213 and a compress function unit 214.

The general processor 211 controls each processing in the user device 200, stores information accepted via the input unit 201 in the storage 220, and controls the transmission/reception of information to/from the server device 300. Further, the general processor 211 performs processing for displaying data on the output unit 202, reads data stored in the storage 220, instructs the random number generator 212 to generate a random number, instructs the basic arithmetic unit 213 to operate data, instructs the compress function unit 214 to compress data, and transmits communication data, verification data and a data identifier of the user device 200 to the server device 300 (see FIG. 1) via the communication unit 203.

The random number generator 212 generates a pseudo-random number using a secret key and others. At this time, a data value of the secret key is updated to a new data value by the random number generator 212 and the new data value is stored in the storage 220 by the general processor 211 again. The random number generator 212 may also generate and output a random number using a physical phenomenon such as temperature, time and electric energy and random number generation algorithm. Further, a random number of arbitrary bit length can be generated by inputting bit length (512, 1024, 2048 and others) to the random number generator 212.

The basic arithmetic unit 213 performs processing related to basic arithmetic operation such as addition, subtraction, modular multiplication and comparison operation.

The compress function unit 214 performs processing for converting data of arbitrary bit length to data of fixed bit length. The compress function unit 214 may also be realized by installing a standard cryptographic hash function.

In the storage 220, verification data, a data identifier, a secret parameter and a public parameter are stored. The verification data denotes data (for example, a search keyword) a storage count of which is to be verified. The data identifier denotes data including information for specifying verification data (for example, identification data such as ID). The secret parameter denotes data generated by the user device 200 every search data pieces. The public parameter denotes data transmitted from the server device 300 for searching data to be searched and denotes data for generating the secret parameter.

(Server Device)

Figure 3:
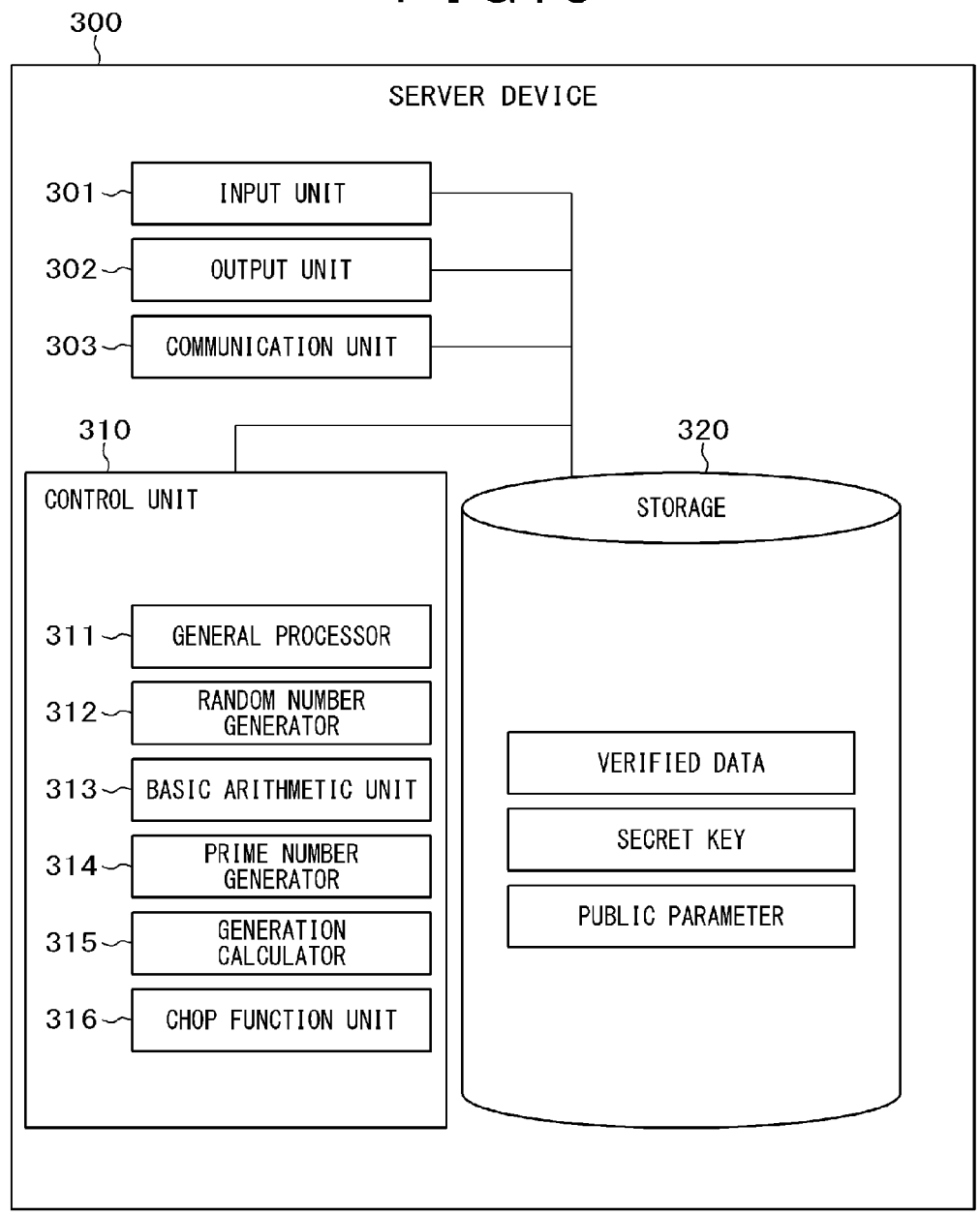
FIG. 3 shows an example of the configuration of a server device according to the first embodiment.

FIG. 3 is a functional schematic diagram showing an example of the configuration of the server device 300 according to the first embodiment. As shown in FIG. 3, the server device 300 is provided with a control unit 310 that processes data, a storage 320 that stores the data, an input unit 301 that inputs information, an output unit 302 that outputs information and a communication unit 303 that transmits/receives data to/from an external device.

The control unit 310 is provided with a general processor 311, a random number generator 312, a basic arithmetic unit 313, a prime number generator 314, a generation calculator 315 and a chop function unit 316.

The general processor 311 comprehensively controls processing in the server device 300, stores information accepted via the input unit 301 in the storage 320, and controls the transmission/reception of information to/from the user device 200. Further, the general processor 311 performs processing for displaying data on the output unit 302, reads data stored in the storage 320, and transmits the data to the user device 200 via the communication unit 303.

The random number generator 312 generates a pseudo-random number using a secret key and others. At this time, a data value of the secret key is updated to a new data value by the random number generator 312 and the new data value is stored in the storage 320 by the general processor 311 again. The random number generator 312 may also generate and output a random number using a physical phenomenon such as temperature, time and electric energy and random number generation algorithm. Further, a random number of arbitrary bit length can be generated by inputting bit length (512, 1024, 2048 and others) to the random number generator 212.

The basic arithmetic unit 313 performs processing related to basic arithmetic operation such as modular multiplication, addition, subtraction and comparison operation.

The prime number generator 314 requests the random number generator 312 to generate a pseudo-random number and generates a prime number via a test for determining whether the generated pseudo-random number is a prime number or not. The prime number generator 314 can be realized by installing standard prime number generation algorithm and a prime number of arbitrary bit length can be generated by inputting bit length (512, 1024, 2048 and others) to the prime number generator 314.

The generation calculator 315 performs processing for generating a generator of a group. For example, the generation calculator generates a generator of a multiplicative group or an additive group of order p.

The chop function unit 316 performs processing for extracting a specific bit string of given data. For example, data of the least significant t bits is extracted from arbitrary data.

In the storage 320, verified data, a secret key and a public parameter are stored. The verified data denotes data (for example, data to be searched on the basis of a search keyword) a storage count of which is to be verified for the user device 200. The secret key denotes data generated by the server device 300. The public parameter denotes data transmitted to the user device 200.

Figure 4:
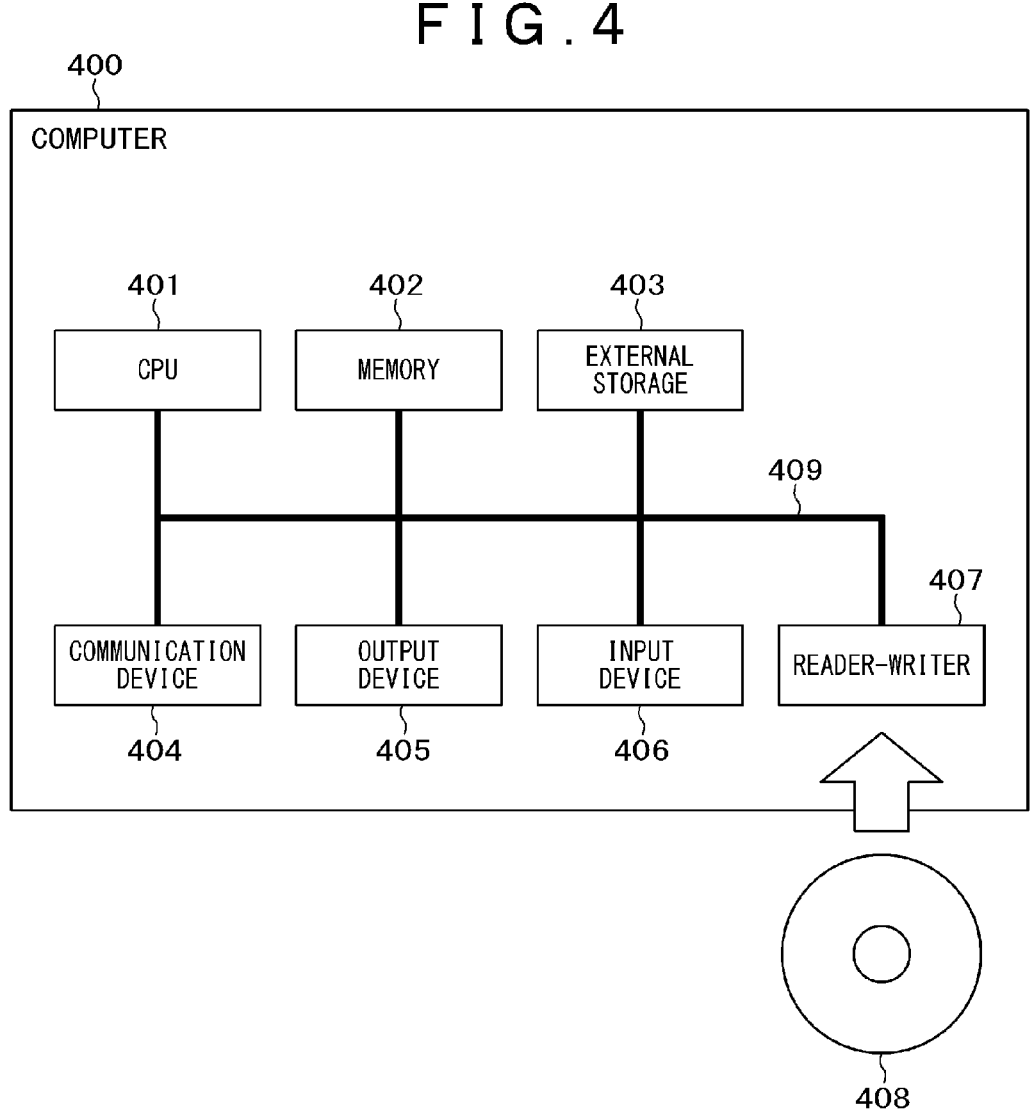
FIG. 4 shows an example of the hardware configuration of the user device and the server device.

FIG. 4 shows an example of the hardware configuration of a computer which is the user device 200 and the server device 300. The computer is realized by a general personal computer (PC) provided with a central processing unit (CPU) 401, a memory 402, an external storage 403 such as a hard disk drive (HDD), a reader-writer 407 such as a compact disk drive (CDD) for reading data on a compact disk (CD) and others, an input device 406 such as a keyboard and a mouse, an output device 405 such as a display, and a communication device 404 such as a network interface card (NIC) for connecting to a communication network.

Each unit 210, 211, 212, 213, 214, 310, 311, 312, 313, 314, 315, 316 shown in FIGS. 2 and 3 is embodied by reading a program stored in the external storage 403 and others into the memory and executing the program by the CPU. For example, the storages 220, 320 can be realized when the CPU 401 utilizes the memory 402 or the external storage 403, each processing unit included in the control units 210, 310 can be realized by loading a predetermined program stored in the external storage 403 into the memory 402 and executing the program by the CPU 401, the input units 201, 301 can be realized when the CPU 401 utilizes the input device 406, the output units 202, 302 can be realized when the CPU 401 utilizes the output device 405, and the communication units 203, 303 can be realized when the CPU 401 utilizes the communication device 404.

<<Flowchart>>

(Process for Registering Public Parameter)

FIG. 5 is a flowchart showing a procedure of a process for generating a secret key and a public parameter according to the first embodiment. This process is performed to share the public parameter between the user device 200 and the server device 300 so that a storage count of identical data can be verified.

First, setting information for generating a secret key and a public parameter is input to the server device 300 via the input unit 301 (S501). The prime number generator 314 generates a prime number p at random and stores it in the storage 320 as a public parameter (S502). Next, the random number generator 312 generates a random number k by uniformly distributing an integer k equal to or larger than 0 and below p at random and stores it in the storage 320 as a secret key (S502).

Next, the generation calculator 315 generates a generator gp of a multiplicative group Gp having a prime number p as order and stores it in the storage 320 as a secret key (S503). Next, the basic arithmetic unit 313 calculates $gp^{-k}$ (S504). In this case, the element $gp^{-k}$ denotes an element of the group Gp having values of exponential modulus multiplication of the minus "k"th power of gp having p as a modulus. The general processor 211 transmits the prime number p, the generator gp and the element $gp^{-k}$ to the user device 200 via the communication unit 303 as communication data (S505).

The general processor 211 of the user device 200 receives the prime number p, the generator gp and the element $gp^{-k}$ which are communication data via the communication unit 203 (S506) and stores them in the storage 220 as a public parameter (S507). Further, the general processor 211 transmits a result of registration of whether the communication data is safely received and can be stored in the storage 220 or not (for example, the element can be stored in the storage 220 as a public parameter or the element cannot be stored in the storage 220 as a public parameter) to the server device 300 via the communication unit 203 as communication data (S508).

The general processor 311 of the server device 300 receives the result of registration which is communication data via the communication unit 303 (S509), terminates the process when the user device 200 can safely register the communication data, returns processing to S505 when the communication data cannot be registered, and performs retransmission processing. As described above, the public parameter generated by the server device 300 is registered in the user device 200 by performing the process for registering the public parameter shown in FIG. 5.

(Process for Generating Secret Parameter)

Figure 6A:
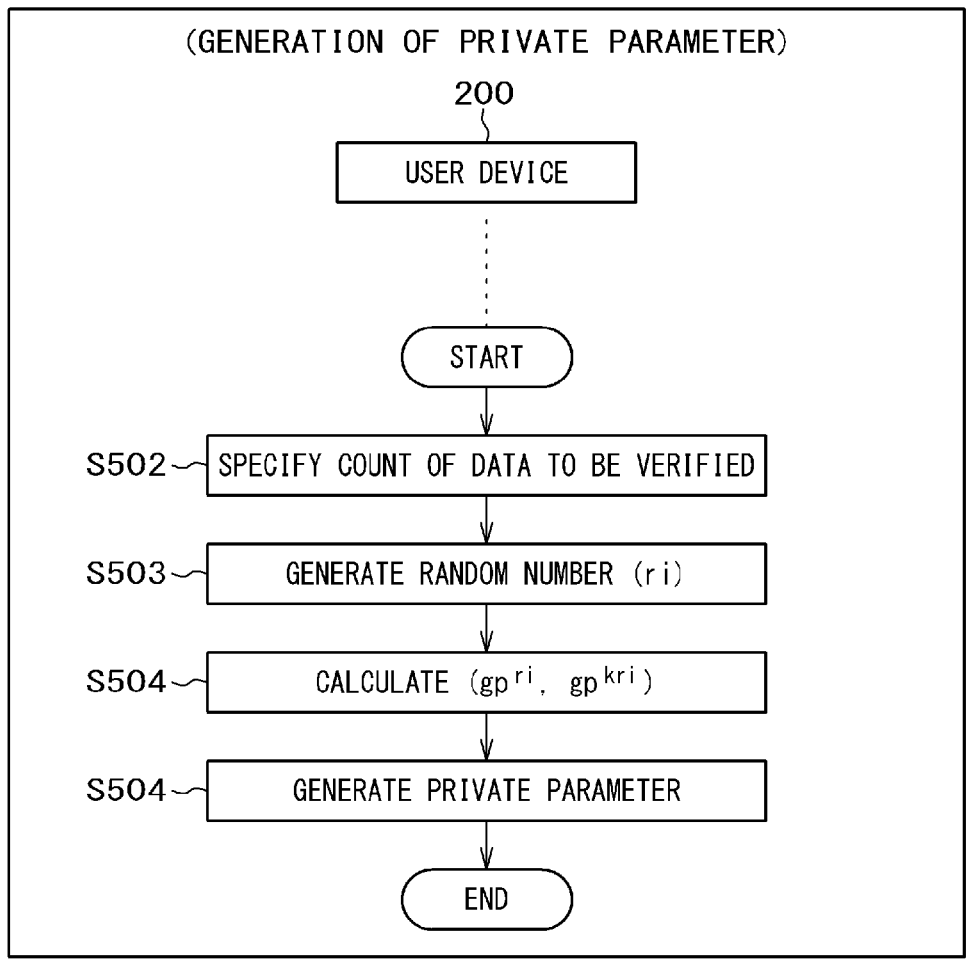
FIG. 6A is a flowchart showing a procedure of a process for generating a secret parameter according to the first embodiment and FIG. 6B shows the configuration of the secret parameter according to the first embodiment.
Figure 6B:
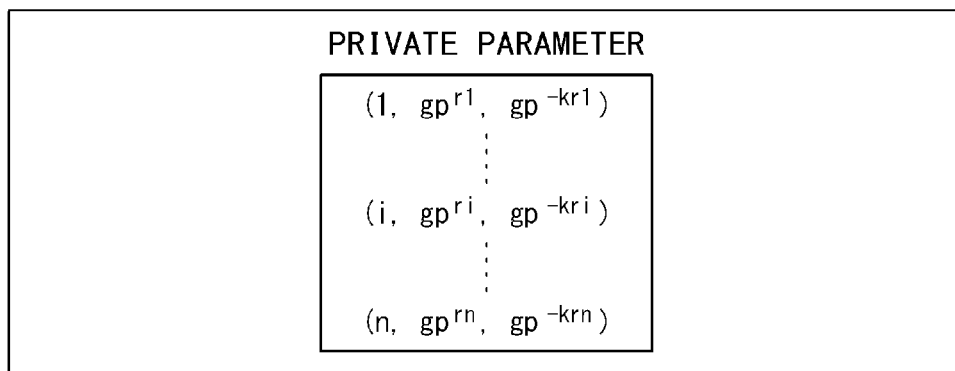

FIG. 6A in FIGS. 6A and 6B is a flowchart showing a procedure of a process for generating a secret parameter in the user device 200 according to the first embodiment. This process is executed before a process for verifying a storage count of identical data shown in FIG. 7 and FIGS. 8A, 8B.

Generally, the preprocessing has execution time to spare and even if the user device 200 has only poor computing power, the user device can really calculate exponential modulus multiplication which is heavy processing because the calculation is allowed to require much time.

First, the user device 200 specifies the number of generated secret parameters (that is, the number of secret parameters corresponding to the number of verified data (for example, the number of search keywords) (S601). Hereafter, the number of generated secret parameters shall be n. The random number generator 212 uniformly generates n integers (r1, r2, - - - , ri, - - - , rn) equal to or larger than 0 and below p (that is, random numbers) at random (S602).

The basic arithmetic unit 213 calculates $gp^{ri}$ and $gp^{-kri}$ (S603). In this case, $gp^{ri}$ denotes exponential modulus multiplication of the "ri"th power of gp having p as a modulus and $gp^{-kri}$ denotes exponential modulus multiplication of the "ri"th power of $gp^{-k}$ having p as a modulus.

The general processor 211 generates n integers i (1, - - - n) as an identifier and stores them as a set of n secret parameters (i, $gp^{ri}$, $gp^{-kri}$) together with $gp^{ri}$ and $gp^{-kri}$ (S604). FIG. 6B shows the configuration of the secret parameters.

(Former Half of Process for Verifying Storage Count of Identical Data)

Figure 7:
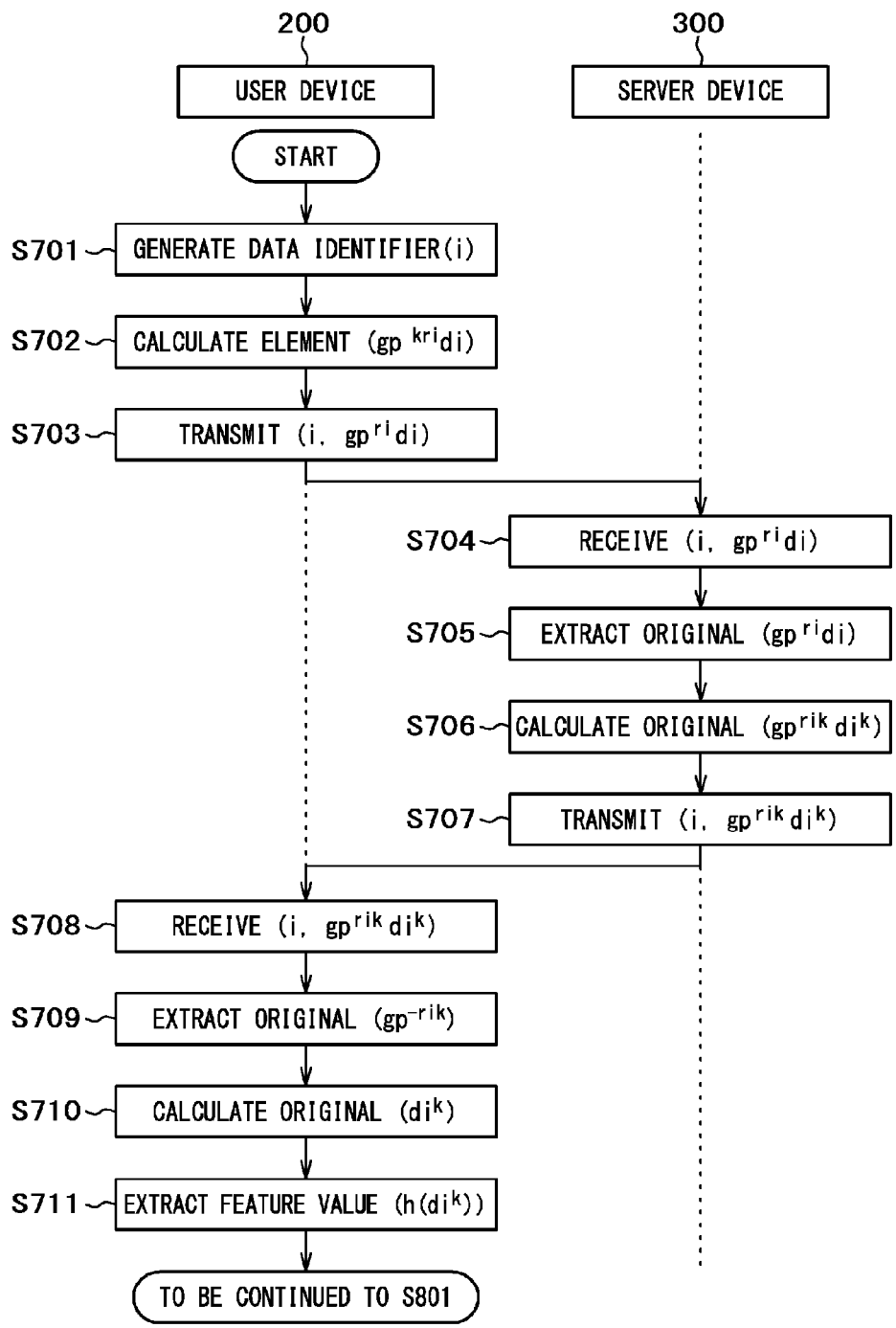
FIG. 7 is a flowchart showing a former half of a procedure of a process for verifying a storage count of identical data according to the first embodiment.

FIG. 7 is a flowchart showing a former half of a procedure of a process for verifying a storage count of identical data according to the first embodiment. A process in which the procedures shown in FIG. 7, FIGS. 8A and 8B are combined is a process in which a client verifies the number of identical data held by the server device 300 without the user device 200 notifying the server device 300 of a result.

First, a data identifier i of verification data di is generated via the input unit 201 of the user device 200 (S701). Hereafter, m data identifiers i (i=1, - - - , m) shall be selected. However, m shall be a positive integer equal to or smaller than n.

The general processor 211 reads the identifier i and the element $gp^{ri}$ from the secret parameter. The basic arithmetic unit 213 calculates an element $gp^{ri}di$ and encrypts it (S702). In this case, the element $gp^{ri}di$ denotes an element of the group Gp having a value of the product by modular multiplication of the element $gp^{ri}$ and the element di. Accordingly, the calculation in S702 is equivalent to not exponential modulus multiplication that imposes a heavy computing load but multiplication a computing load of which is light.

Figure 9A:
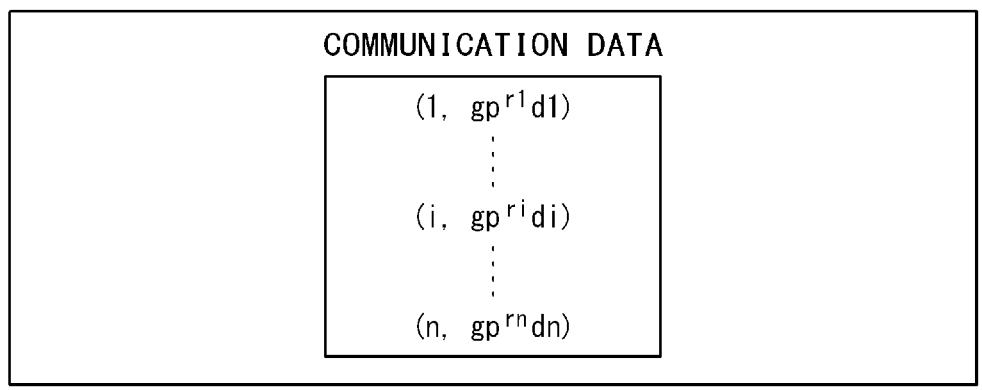
FIG. 9A shows the configuration of communication data according to the first embodiment.
Figure 9B:
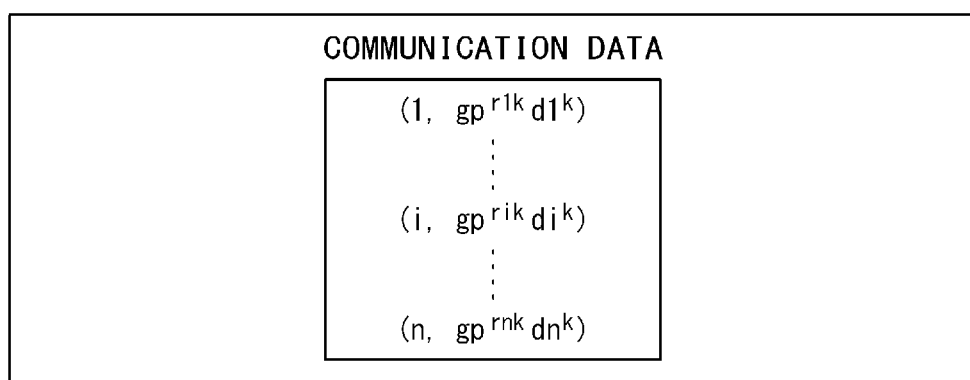
FIG. 9B shows the configuration of communication data according to the first embodiment.

The general processor 211 converts the identifier i and the element $gp^{ri}di$ as a set (i, $gp^{ri}di$) to communication data and transmits it to the server device 300 via the communication unit 203 (S703). FIG. 9A in FIGS. 9A, 9B shows a part of the communication data transmitted in S703.

The general processor 311 of the server device 300 receives the communication data (i, $gp^{ri}di$) via the communication unit 303 and stores it in the storage 320 (S704). The general processor 311 extracts the element $gp^{ri}di$ from the communication data (S705). The basic arithmetic unit 313 raises the element $gp^{ri}di$ to the "k"th power, acquires an element ($gp^{rik}di^k$), and re-encrypts it (S706). In this case, the kth power denotes exponential modulus multiplication of the kth power of the element $gp^{ri}di$ having p as a modulus.

The general processor 311 converts all sets (i, $gp^{rik}di^k$) to communication data and transmits it to the user device 200 via the communication unit 303 (S707). FIG. 9B shows a part of the communication data transmitted in S707. The general processor 211 of the user device 200 receives (i, $gp^{rik}di^k$) which is communication data in i=1, - - -, m via the communication unit 203 (S708).

The general processor 211 extracts the identifier i and the element $gp^{rik}di^k$ from the communication data and extracts an element $gp^{-rik}$ which is a set with the same identifier i as the communication data from the secret parameter (S709). The basic arithmetic unit 213 calculates a product of the element $gp^{-rik}$ and the element $gp^{rik}di^k$ and acquires an element $di^k$ (S710). The compress function unit 214 outputs a feature value h ($di^k$) of the element $di^k$ and notifies the server device 300 of it (S711). As described above, in the former half of the procedure of the process for verifying a storage count of identical data shown in FIG. 7, the server device 300 performs exponential modulus multiplication heavy in a computing load, while the user device 200 only calculates a modulus without exponential modulus multiplication and calculates respective feature values of search keywords, therefore an excessive processing load is not imposed on a client.

FIG. 8A is a flowchart showing a latter half of the procedure of the process for verifying a storage count of identical data according to the first embodiment. When the server device 300 is notified of the output of the feature value h ($di^k$) from the user device 200, the server device selects verified data ci (S801). Hereafter, L pieces of verified data ci (i=1, - - -, L) shall be selected.

Next, the basic arithmetic unit 313 calculates an element $ci^k$ (S802). In this case, the element $ci^k$ denotes an element of the group Gp having a value of exponential modulus multiplication of the "k"th power of the element ci having p as a modulus. The chop function unit 316 outputs a feature value h ($ci^k$) of the element $ci^k$ (S803).

The chop function unit 316 extracts the least significant t bits ch (h ($ci^k$)) from the feature value h ($ci^k$) (S804). The general processor 311 converts ch (h ($ci^k$)) to communication data and transmits it to the user device 200 via the communication unit 303 (S805).

The general processor 211 of the user device 200 receives ch (h ($ci^k$)) which is the communication data via the communication unit 203 (S806). The compress function unit 214 extracts the least significant t bits ch (h ($di^k$)) from the feature value h ($di^k$) (S807). The general processor 211 compares ch (h ($di^k$)) (i=1, - - -, m) with ch (h ($ci^k$)) (i=1, - - -, L), regards them as identical data when values are equal, and regards the number as a storage count of identical data (S808). As described above, exponential modulus multiplication of respective verified data which is an object of a search is performed, feature values are calculated, the calculated feature values and feature values of respective search keywords calculated in FIG. 7 are compared and a storage count of identical data is determined when the latter half of the procedure of the process for verifying a storage count of identical data shown in FIG. 8A is finished, therefore the server device 300 is not notified of whether a client holds identical data or not (only the storage count is known, concealing held identical data). Further, since the user side does not perform exponential modulus multiplication in the search, the client can efficiently perform computing processing.

In S804 and S809, the least significant t bits are extracted by a chop function. However, other bits may also be extracted as long as other bits are in the same location in S804 and S809. For example, the most significant t bits may also be extracted or only one bit may also be extracted from t locations at random. Further, (though communication traffic increases,) the processing in S804 and S809 is omitted and the feature value h ($ci^k$) and the feature value h ($di^k$) may also be compared.

In the method shown in the flowchart in FIG. 8A, since communication data is proportional to the number (L) of verification data, the communication data also simultaneously grows when L is large. Hence, another procedure is shown in FIG. 8B having the effect that communication traffic between the user device 200 and the server device 300 is reduced, compared with the method shown in FIG. 8A. Since the processing in S801 to S804 is similar to that shown in FIG. 8A, its description is omitted.

The general processor 311 generates a feature value group b of $2^t$ bits. Further, the general processor expresses each bit in the feature value group b in the shape of (b1, - - -, $b2^t$) and initializes all bits (S805b). The general processor 311 converts the bit equivalent to the ch (h ($ci^k$))"th" of the feature value group b to 1 (S806b).

The general processor 311 converts the feature value group b to communication data and transmits the communication data to the user device 200 via the communication unit 303 (S807b). The general processor 211 of the user device 200 receives the feature value group b which is the communication data via the communication unit 203 (S808b).

The general processor 211 reads the feature value h ($di^k$) and extracts a bit value (0 or 1) equivalent to the h ($di^k$)"th" of the feature value group b (S809b). The general processor 211 repeats the processing in S809 for m feature values h ($di^k$) and regards the total of the bits as a storage count of identical data (S810b). The chop function may also extract another part as long as another part is in the same location as in S804 and S809.

As described above, according to the first embodiment, the user device 200 can verify the number of identical data which the server device 300 has with the verification data. Further, according to the first embodiment, computing processing of a client is reduced owing to preliminary computing processing and efficient verification can be realized.

(Application Object of First Embodiment)

Figure 10A:
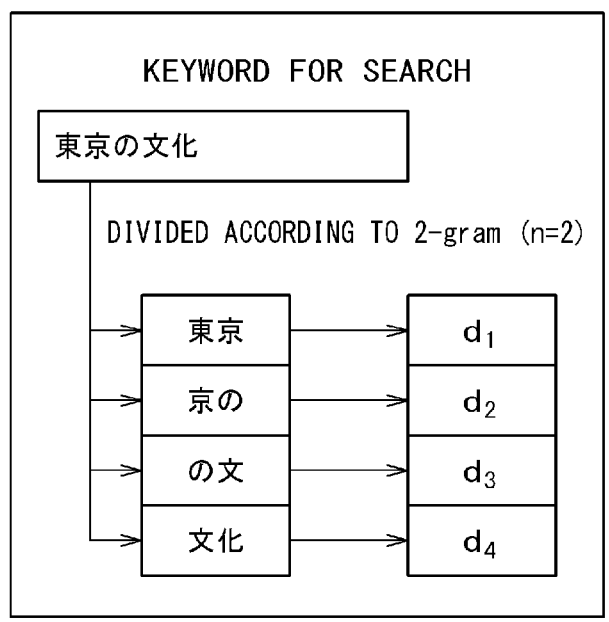
FIG. 10A shows a procedure of a process for generating search data on the basis of a search keyword according to the first embodiment.
Figure 10B:
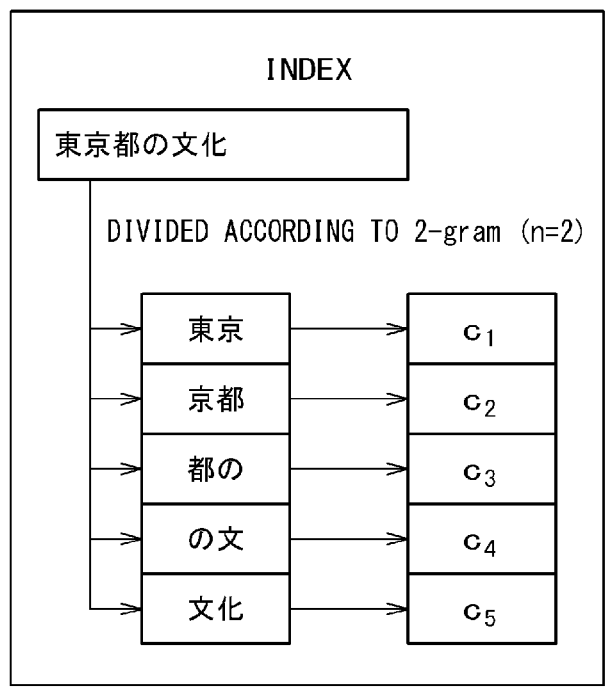
FIG. 10B shows a procedure of a process for generating searched data on the basis of an index according to the first embodiment.

According to the first embodiment, a user can utilize service without disclosing his/her information to a service provider that provides the service for performing the similarity search of electronic data. Generally, to accelerate a search, an index for a search is assigned to electronic data to be searched beforehand. The first embodiment can be applied to this index. For example, a process flow on the user side is shown in FIG. 10A in FIGS. 10A and 10B and a part of a process flow on the service provider side is shown in FIG. 10B. The service provider provides search service using n-gram which is general technique for a search. FIG. 10A shows one example (culture of Tokyo) of a keyword for a search input to a user device by a user when the user utilizes search service. The keyword for a search is divided every n characters (two characters in FIG. 10A) and is converted into verification data d1, d2, - - -. Further, FIG. 10B shows one example (culture of the Metropolis of Tokyo) of an index for a search prepared in the server device when search service is utilized. Like the keyword for a search, the index is also divided every n characters (two characters in FIG. 10B) and is converted into verified data c1, c2, - - -. Hereafter, the verification of whether the number of the verification data and the number of the verified data are the same or not shall comply with the process flow in the first embodiment.

In this case, an example in which the first embodiment is applied to the search service using n-gram is shown. However, the first embodiment can also be applied to a case using another search technique. Further, when data is searched without using an index, the first embodiment can also be applied by regarding data itself as data to be searched.

(Application of First Embodiment)

In the first embodiment, the example using the multiplicative group Gp is described. However, since addition can be used in place of multiplication, an additive group (an additive group on an elliptic curve) may also be used in place of the multiplicative group GP. Further, a ring and a field having another mathematical property may also be used.

LIST OF REFERENCE SIGNS

100: Network
200: User device
201: Input unit
202: Output unit
203: Communication unit
210: Control unit
211: General processor
212: Random number generator
213: Basic arithmetic unit
214: Compress function unit
220: Storage
300: Server device
301: Input unit
302: Output unit.
303: Communication unit
310: Control unit
311: General processor
312: Random number generator
313: Basic arithmetic unit
314: Prime number generator
315: Generation calculator
316: Chop function unit
320: Storage
400: Computer
401: Central processing unit (CPU)
402: Memory
403: External storage
404: Communication device
405: Output device
406: Input device
407: Reader-writer
408: Storage medium
409: Internal communication line
A: Storage count verification system.

The invention claimed is:

1. A storage count verification system that verifies whether both a user device and a server device hold identical data or not when data to be searched in the server device is searched using search data requested from the user device,
    wherein the server device comprises:
        a server generator that generates a public parameter for searching the data to be searched; and
        a server communication unit that transmits the generated public parameter to the user device;
        a key generator that generates a secret key related to the data to be searched; and
        a server encryption unit that re-encrypts the respective encrypted search data on the basis of the secret key,
    wherein the user device comprises:
        a user generator that generates a secret parameter related to the search data and corresponding to the public parameter on the basis of the public parameter received from the server device;
        a user encryption unit that encrypts the search data on the basis of the generated secret parameter; and
        a user communication unit that transmits the encrypted search data to the server device or receives the re-encrypted search data from the server device.

2. The storage count verification system according to claim 1, wherein the server device generates the public parameter on the basis of the secret key generated by the key generator.

3. The storage count verification system according to claim 2, wherein the user device is further provided with a user processor that extracts a feature value of the search data on the basis of the re-encrypted search data and the secret parameter.

4. The storage count verification system according to claim 3,
    wherein the server device is provided with a server processor that compresses the searched data and transmits a feature value group acquired by extracting their feature values to the user device; and
    the user device receives the feature value group via the user communication unit and the user processor determines the number of the searched data and the number of the search data respectively having the same value on the basis of the received feature value group and the feature value of the search data.

5. The storage count verification system according to claim 4,
    wherein in the user device, the user processor divides a keyword for a search of the searched data and converts the divided data to the search data; and
    in the server device, the server processor divides an index for searching the data to be searched and converts the divided data to the searched data.

6. The storage count verification system according to claim 1, wherein in the user device, the user generator generates the secret parameter by the exponential modulus multiplication of data extracted from the public parameter and a random number on the basis of the data, the number of the verification data and the random number generated by the number of the verification data before the data to be searched is searched by the search data.

* * * * *